United States Patent [19]
Kaercher

[11] Patent Number: 5,923,336
[45] Date of Patent: Jul. 13, 1999

[54] METHOD OF ASSOCIATING A DIMENSIONAL REPRESENTATION WITH A STRUCTURE IN A CAD SYSTEM

[75] Inventor: Michael Kaercher, Stuttgart, Germany

[73] Assignee: Hewlett-Packard Company, Palo Alto, Calif.

[21] Appl. No.: 08/962,509

[22] Filed: Oct. 31, 1997

Related U.S. Application Data

[63] Continuation of application No. 08/541,106, Oct. 11, 1995, abandoned.

[30] Foreign Application Priority Data

Mar. 29, 1995 [EP] European Pat. Off. .............. 95104671

[51] Int. Cl.⁶ .................................................. G06T 11/00
[52] U.S. Cl. ............................................................ 345/435
[58] Field of Search ............................ 707/502; 345/433, 345/435, 441

[56] References Cited

U.S. PATENT DOCUMENTS

| | | | |
|---|---|---|---|
| 5,414,807 | 5/1995 | Seki et al. ............................ | 395/141 X |
| 5,467,444 | 11/1995 | Kawamura et al. ..................... | 395/141 |
| 5,548,706 | 8/1996 | Koizumi et al. ...................... | 395/141 X |
| 5,548,707 | 8/1996 | LoNegro et al. ..................... | 395/141 X |

FOREIGN PATENT DOCUMENTS 0 218 246  8/1986  European Pat. Off. .

OTHER PUBLICATIONS

Computer Aided Design, vol. 25, No. 9, Sep. 1993, London GB pp. 577–586, Guilford et al 'Representational Primitives for Geometric Tolerancing'.
Computer Aided Design, vol. 25, No. 1, Jan. 1993, London GB pp. 29–38, Duan et al 'FSMT: a feature solid–modelling tool for feature–based design and manufacture'.
Computer Aided Design, vol. 23, No. 5, Jun. 1991, London GB pp. 385–391 Roller 'An approach to computer–aided parametric design'.
European Search Report—Aug. 8, 1995.

*Primary Examiner*—Almis R. Jankus

[57] ABSTRACT

In a method and a CAD system for associating a dimensional representation with a structure, in particular with a structure of a technical drawing in a two-dimensional representation, a reference structure with an associated dimensional representation is selected from a database, the reference structure is associated with the structure, it is determined whether the topology of the structure corresponds to the topology of the reference structure, and the dimensional representation of the reference structure is transferred to the structure, if the topology of the structure corresponds to the topology of the reference structure.

8 Claims, 6 Drawing Sheets

METHOD OF ASSOCIATING A DIMENSIONAL REPRESENTATION WITH A STRUCTURE IN A CAD SYSTEM

This is a continuation of application Ser. No. 08/541,106 filed on Oct. 11, 1995 now abandoned.

FIELD OF THE INVENTION

The present invention refers to a method of associating a dimensional representation with a structure in a CAD system, in particular with a structure of a technical drawing in a CAD system with a two-dimensional representation. The present invention additionally refers to a CAD system used for associating a dimensional representation with a structure, in particular with a structure of a technical drawing in a two-dimensional representation.

DESCRIPTION OF THE PRIOR ART

When technical drawings are produced, it is necessary to provide them with dimensional representations so that the object shown in the technical drawing can be manufactured in a subsequent production process.

Figure 8:
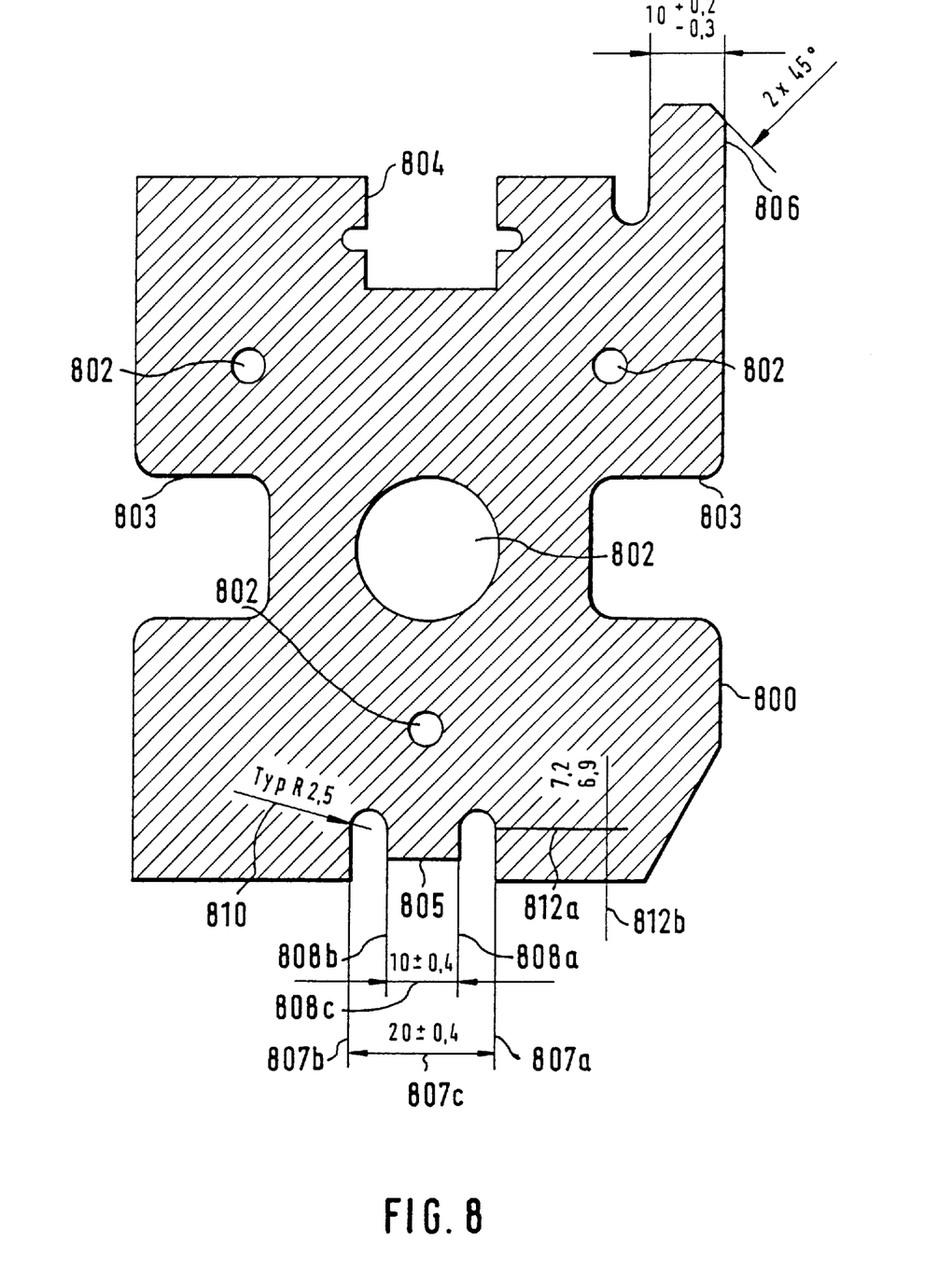
FIG. 8 shows a representation of a technical drawing with associated dimensional representations.

In FIG. 8, a technical drawing 800 is shown. This technical drawing shows a sheet-metal component which is to be produced from a metal sheet. The sheet-metal component to be produced has a plurality of round through holes 802 with different diameters as well as a plurality of incisions 803, 804 and 805, which are arranged on the edge of said sheet-metal component and which have different structures. Furthermore, said technical drawing 800 shows a projection 806.

For an accurate production of this sheet-metal component, it is necessary to specify the dimensions of said component in the technical drawing. Only as an example of such a dimensional representation, the dimensional representations of the recess 805 and of the projection 806 are shown in the technical drawing 800. The dimensions of the other structures have been omitted for the sake of clarity of the representation.

The recess 805 is provided with a plurality of dimensional representation elements, which are necessary for accurately defining the shape and the size of said recess 805.

For each structure of the technical drawing 800, it will be necessary to successively include the respective dimensional representation elements in the technical drawing. In the case of recess 805, this means that the dimensional representation elements 807a, 807b and 807c; 808a, 808b and 808c; 810; and 812a and 812b must be included successively.

This course of action entails a substantial disadvantage. The recess 805 in the technical drawing 800, for example, represents a structure which appears in a plurality of technical drawings of different sheet-metal components. Hence, it will be necessary to include the individual dimensional representation elements 807a to 812b in the manner described hereinbefore in each new technical drawing. This will result in an essential expenditure of work when the technical drawing is produced.

SUMMARY OF THE INVENTION

Taking this prior art as a basis, it is the object of the present invention to provide a method on the basis of which it will be less difficult to provide structures of a technical drawing with dimensional representations, especially if the structures in question are frequently recurring structures, whereby the time required for making a technical drawing will be reduced substantially.

This object is solved by a method according to claim 1.

The present invention provides a method of associating a dimensional representation with a structure in a CAD system, in particular with a structure of a technical drawing in a CAD system with a two-dimensional representation, comprising the following steps:

1. selecting a reference structure with an associated dimensional representation from a database;
2. associating said reference structure with the structure;
3. determining whether the topology of said structure corresponds to the topology of said reference structure; and
4. if this is the case, transferring the dimensional representation of said reference structure to said structure.

It is the object of the present invention to provide a CAD system by means of which it will be less difficult to provide structures of a technical drawing with dimensional representations, especially if the structures in question are frequently recurring structures, whereby the time required for making a technical drawing will be reduced.

This object is solved by a CAD system according to claim 9.

The present invention provides a CAD system used for associating a dimensional representation with a structure, in particular with a structure of a technical drawing in a two-dimensional representation, comprising:

a database having stored therein at least one reference structure which has associated therewith a dimensional representation;

means for selecting said reference structure from said database;

means for associating said reference structure with the structure;

means for determining whether the topology of said structure corresponds to the topology of said reference structure; and means for transferring the dimensional representation of said reference structure to said structure if the determination means determines that the topologies correspond.

Preferred further developments of the present invention are defined in the subclaims.

BRIEF DESCRIPTION OF THE DRAWINGS

In the following, preferred embodiments of the present invention will be described in detail on the basis of the drawings enclosed, in which:

FIGS. 1 a–1b shows a reference structure with an associated dimensional representation and a structure having the same topology;

DESCRIPTION OF THE PREFERRED EMBODIMENTS

The terms used in the description will be described in detail hereinbelow on the basis of FIGS. 1 and 2.

Figure 1A:
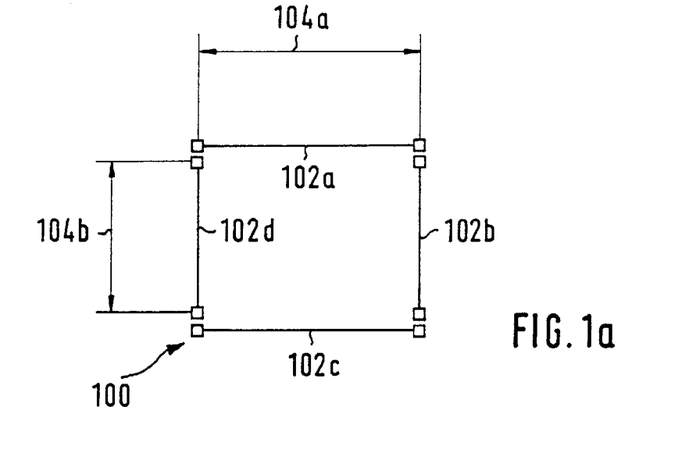

FIG. 1a shows a so-called reference structure 100 with an associated dimensional representation. In this example, the reference structure 100 is composed of four reference structure elements 102a, 102b, 102c and 102d. The reference structure elements 102a . . . 102d have their respective end points connected to the end points of neighbouring reference structure elements.

The reference structure elements 102a . . . 102d form the topology of the reference structure 100. The term topology describes in this connection the number, nature and sequence of the structure elements of a structure.

Reference is made to the fact that the dimensions of the individual reference structure elements are not a constituent part of the topology.

FIG. 1a shows the reference structure 100 with the associated dimensional representation. In this example, said dimensional representation comprises two dimensional representation elements 104a and 104b. The dimensional representation element 104a is associated with the reference structure element 102a, and the dimensional representation element 104b is associated with the reference structure element 102d.

Figure 1B:
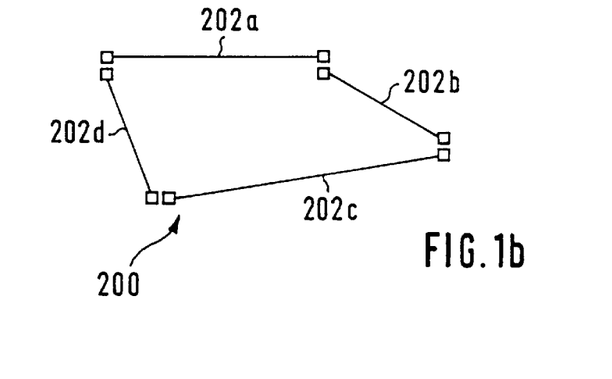

In FIG. 1b, a structure 200 is shown, which is to be provided with a dimensional representation of the type determined by the reference structure 100.

The structure 200 comprises four structure elements 202a, 202b, 202c and 202d, which have their respective end points connected to the end points of neighbouring structure elements.

The topology of the structure in FIG. 1b corresponds to the topology of the reference structure 100 of FIG. 1a. As has already been described, the topology is defined by the number, nature and sequence of a structure.

The reference structure in FIG. 1a comprises four reference structure elements 102a . . . 102d, which are all of the same nature, viz. straight lines. Also the structure 200 comprises four structure elements 200a . . . 200d, which, too, are all of the same nature, viz. straight lines. The sequence of the individual structure elements in FIG. 1a and FIG. 1b, respectively, is also identical. It follows that the topologies of the reference structure of FIG. 1a and of the structure of FIG. 1b are identical.

The method according to the present invention selects, in a first step, the reference structure 100 and the dimensional representation 104a, 104b associated therewith from a database. Subsequently, this reference structure 100 is associated with the structure 200 and it is determined whether the topology of said structure 200 corresponds to the topology of said reference structure 100, as has already been described hereinbefore. If the topologies correspond, the dimensional representation 104a, 104b of the reference structure 100 will be transferred to said structure 200.

Figure 2:
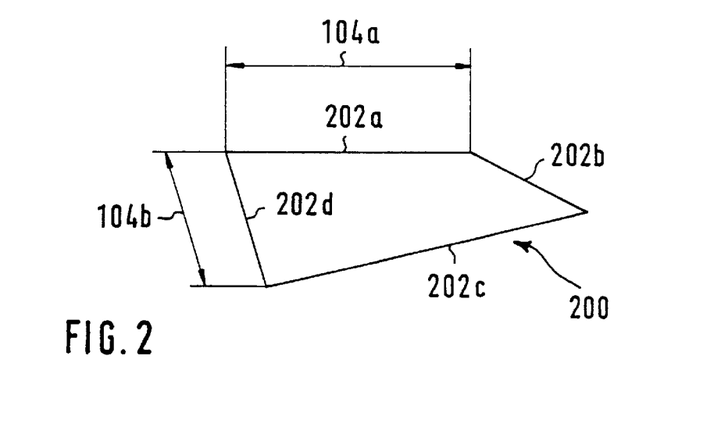
FIG. 2 shows the structure of FIG. 1 to which the dimensional representation has been transferred.

The resultant structure 200 plus dimensional representation is shown in FIG. 2. The structure elements 202a and 202d have associated therewith the corresponding dimensional representation elements 104a and 104b.

In the following, the method according to the present invention and the CAD system according to the present invention will be described more precisely on the basis of FIGS. 3 to 7.

In said figures, like reference numerals have been used throughout to designate identical elements.

Figure 3:
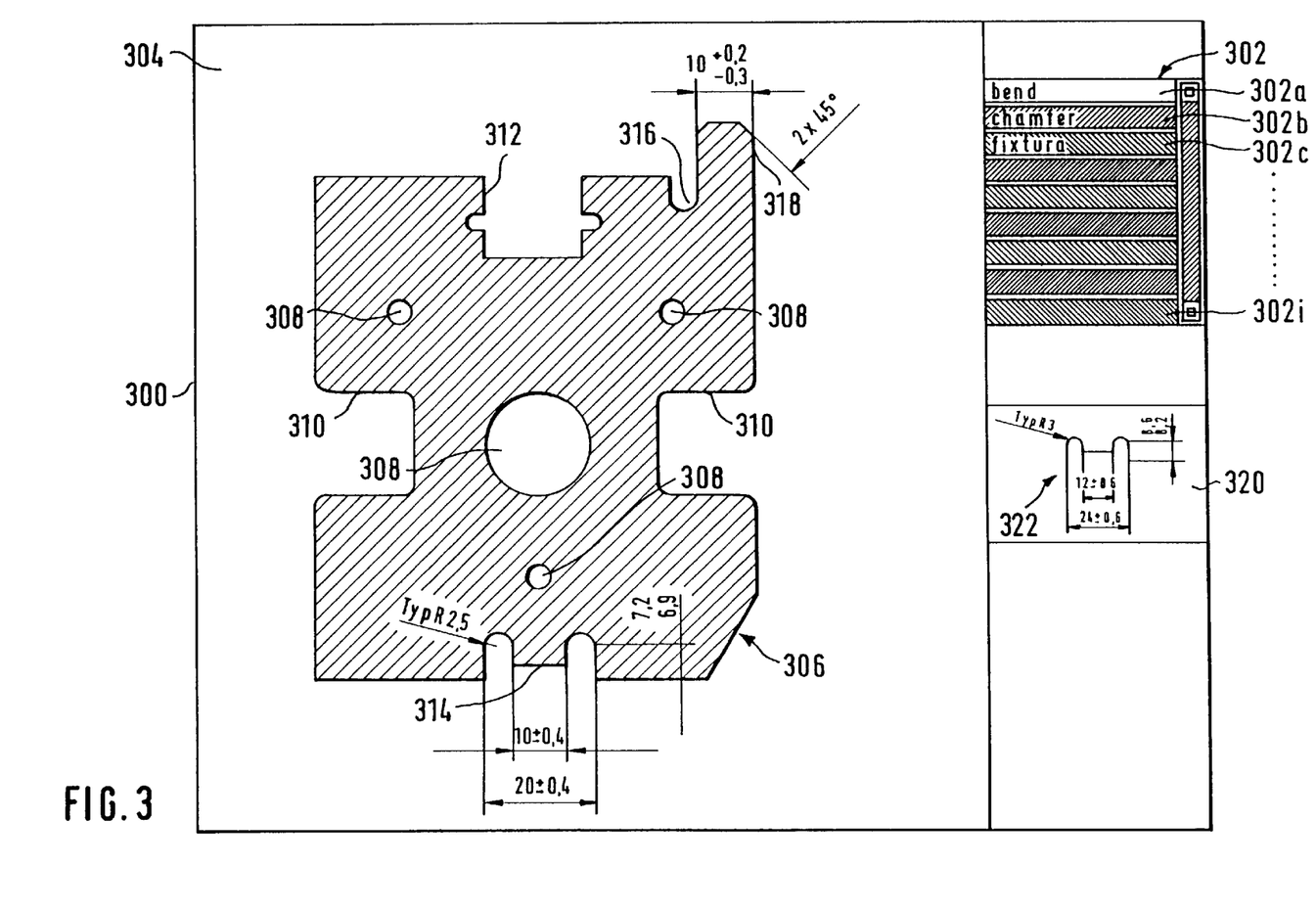
FIG. 3 shows a first embodiment for the transfer of a dimensional representation of a reference structure to a structure in a technical drawing in a CAD system with two-dimensional representation.

FIG. 3 shows a detail 300 of the CAD system according to the present invention. This CAD system comprises a database (not shown) having stored therein at least one reference structure with an associated dimensional representation.

A selection means 302 is provided for selecting the reference structure from the database. This selection means comprises a plurality of selection fields 302a . . . 302i. Said selection fields are used for displaying the respective file names under which the reference structures in question are filed in the database. The selection of a reference structure from the database is carried out by selecting a selection field.

In the embodiment shown in FIG. 3, the selection fields 302a . . . 302c are occupied and the residual selection fields are empty. This means that only three reference structures are stored in the database. In the embodiment shown in FIG. 3, the first selection field, which is called "bend", has been selected.

The CAD system according to the present invention additionally comprises means for associating the reference structure with the structure in question. These means comprise e.g. a mouse with the aid of which a cursor can be moved on the screen of the CAD system. The reference structure can be associated with the structure in question with the aid of this cursor.

The CAD system additionally comprises a central processing unit (not shown) which determines whether the topology of the relevant structure corresponds with the topology of the reference structure. This central processing unit will transfer the dimensional representation of the reference structure to the structure in question if it determines that the topologies correspond to each other.

In the embodiment shown in FIG. 3, the CAD system according to the present invention comprises a main window 304 in which the technical drawing 306 is shown.

The technical drawing 306 shown in FIG. 3 serves to produce a sheet-metal component from a metal sheet. The technical drawing shows a plurality of through holes 308, a plurality of different recesses 310, 312, 314 and 316 as well as a projection 318.

In addition to the main window 304, the CAD system according to the present invention also shows a preview window 320 which displays the reference structure 322 and the dimensional representation associated therewith selected from said database.

In the present embodiment, the reference structure 322 shown in said preview window 320 is to be associated with structure 314 of the technical drawing 306.

In the following, it will be explained in detail, on the basis of FIGS. 4 and 5, how the dimensional representation of the reference structure is associated with said structure.

Figure 4:
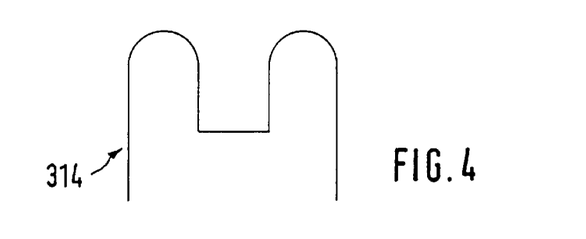
FIG. 4 shows the structure of the technical drawing of FIG. 3 which is to be provided with a dimensional representation.

In FIG. 4, structure 314 is shown separately for the sake of clarity.

Figure 5A:
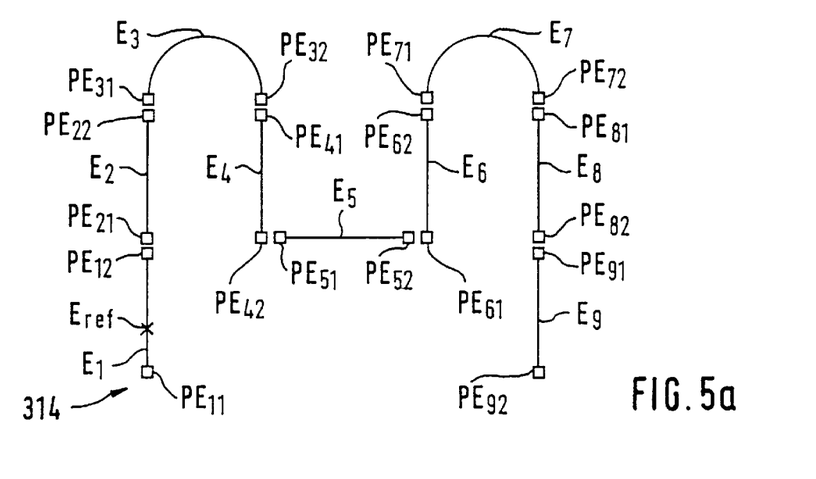
FIGS. 5a–5b shows the reference structure with an associated dimensional representation and the structure of the technical drawing of FIGS. 3 and 4.

In FIG. 5a, said structure 314 is represented by the individual structure elements $E_1, E_2, \ldots E_9$. Each structure element has associated therewith two end points $PE_{11}, PE_{12}, \ldots PE_{91}, PE_{92}$ in the present embodiment. The structure element $E_1$ has associated therewith the end points $PE_{11}$ and $PE_{12}$.

Figure 5B:
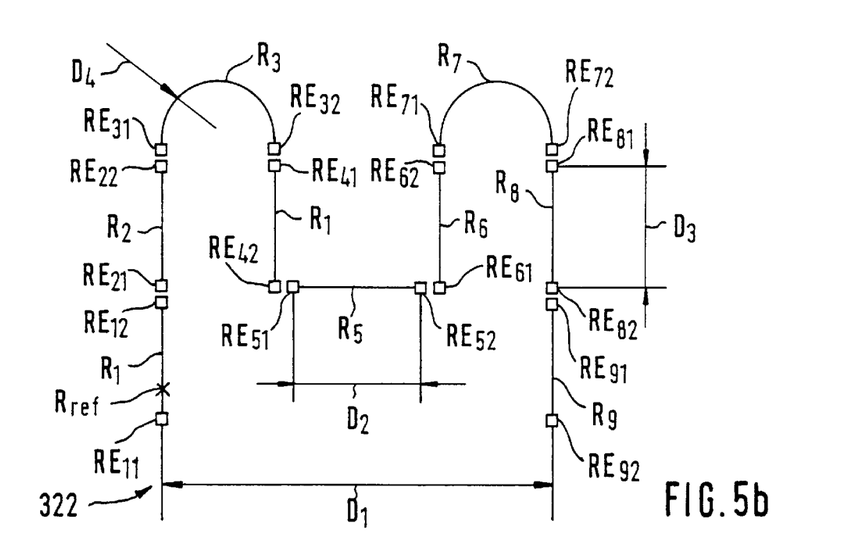

The reference structure 322, which is selected making use of the selection means 302, is shown in FIG. 5b together with the dimensional representation associated therewith. Said reference structure 322 comprises a plurality of reference structure elements $R_1 \ldots R_9$, and also each of said reference structure elements has two end points $RE_{11}, RE_{12}, \ldots RE_{91}, RE_{92}$. The reference structure element $R_1$ includes the end points $RE_{11}$ and $RE_{21}$.

Furthermore, said reference structure 322 has associated therewith a dimensional representation which consists of the dimensional representation elements $D_1 \ldots D_4$. The respective dimensional representation elements $D_1 \ldots D_4$ are each composed of a plurality of individual elements.

In the embodiment shown in FIG. 3, the dimensional representation elements are additionally provided with dimensioning data.

The association of the selected reference structure 322 with said structure 314 essentially takes place in two steps.

In a first step, a reference point $R_{ref}$ is defined on said reference structure 322, more precisely on a reference structure element $R_1$.

In a further step, a structure point $E_{ref}$ is defined on said structure 314, more precisely on the structure element $E_1$. The position of the reference point $R_{ref}$ and the position of the structure point $E_{ref}$ essentially correspond with respect to the topologies of said reference structure 322 and of said structure 314.

After having associated the reference structure 322 with said structure 314, the number, the nature and the sequence of the structure elements $E_1 \ldots E_9$ of said structure 314 is determined. Following this, the number, the nature and the sequence of the reference structure elements $R_1 \ldots R_9$ of said reference structure 322 is determined.

In the next step, it is found out whether the number, the nature and the sequence of the structure elements $E_1 \ldots E_9$ of said structure 314 correspond to those of the reference structure elements $R_1 \ldots R_9$ of said reference structure 322. If this is the case, it is determined that the topology of said structure 314 and the topology of said reference structure 322 correspond.

The above described determinatian of the correspondence of the topologies of said structure 314 and of said reference structure 322 is carried out in a first step by determining a first structure element $E_1$. This first structure element $E_1$ is determined on the basis of the structure point $E_{ref}$ which has already been defined. Subsequently, it is determined whether the first structure element $E_1$ corresponds to a first reference structure element $R_1$. This first reference structure element $R_1$ is defined by the reference point Rref which has already been determined. Following this, a determination of a subsequent structure element, e.g. the structure element $E_2$, and of a subsequent reference structure element, e.g. the reference structure element $R_2$, is first carried out for all the additional structure elements of said structure 314, and, afterwards, it is determined whether said subsequent structure element corresponds to said subsequent reference structure element.

When these examinations have been finished, it can be determined, on the basis of the number, nature and sequence of the structure elements of said structure 314 and on the basis of the number, nature and sequence of the reference structure elements of said reference structure 322, whether the topologies of said structure 314 and of said reference structure 322 correspond.

When it has been determined that the topologies of said structures 314 and 322 correspond, the transfer of the dimensional representation from the reference structure 322 to said structure 314 begins.

It is now determined with regard to all reference structure elements $R_1$ to $R_9$ whether a reference structure element is provided with a dimensional representation.

In the case of the reference structure shown in FIG. 5b, the dimensional representation element $D_1$ is connected to the end points $RE_{11}$, of the reference structure element $R_1$ and to the end point $RE_{92}$ of the reference structure element $R_9$, the dimensional representation element $D_2$ is associated with the reference structure element $R_5$, the dimensional representation element $D_3$ is associated with the reference structure element $R_8$, and the dimensional representation element $D_4$ is associated with the reference structure element $R_3$. All the other reference structure elements do not have associated therewith any dimensional representations.

In all the cases where dimensional representation elements exist, said dimensional representation elements are transferred to the structure elements of the structure 314 which correspond with respect to the topology. It follows that the dimensional representation element $D_1$ lies between the end point $PE_{11}$ of the structure element $E_1$ and the end point $PE_{92}$ of the structure element $E_9$; the dimensional representation element $D_2$ is associated with the structure element $E_5$, the dimensional representation element $D_3$ is associated with the structure element $E_8$, and the dimensional representation element $D_4$ is associated with the structure element $E_3$. The resultant dimensional representation of structure 314 is shown in FIG. 3.

It has already been pointed out hereinbefore that the dimensional representation of the reference structure may be provided with dimensioning data in addition to the individual dimensional representation elements. The reference structure 322 selected in FIG. 3 is provided with such dimensioning data. The dimensioning data values shown in FIG. 3 in connection with 322 differ from those shown in connection with structure 314. When dimensioning data values exist in the reference structure, an extra adaptation of these dimensioning values to the actual dimensions of said structure 314 is carried out in addition to the transfer of the dimensional representation from the reference structure to said structure 314.

In addition to the reading of reference structures from the database, the method according to the present invention also permits the definition of further reference structures. For this purpose, the structure which will be stored as a reference structure in the database later on is produced in a first step. Following this, said reference structure is provided with the desired dimensional representation and said reference structure as well as the dimensional representation associated therewith are stored in the database.

As soon as this newly prepared reference structure has been stored in the database, it can be used, in the manner described hereinbefore, for the purpose of transfer to a structure in an technical drawing.

As has already been described hereinbefore, possible dimensioning data values of the newly prepared reference structure, which have been stored together with said reference structure, will not be detrimental with regard to an application to structures having different dimensions, since an adaptation of the dimensioning data values to the actual dimensions of the structure in question is carried out in accordance with the present invention.

Figure 6:
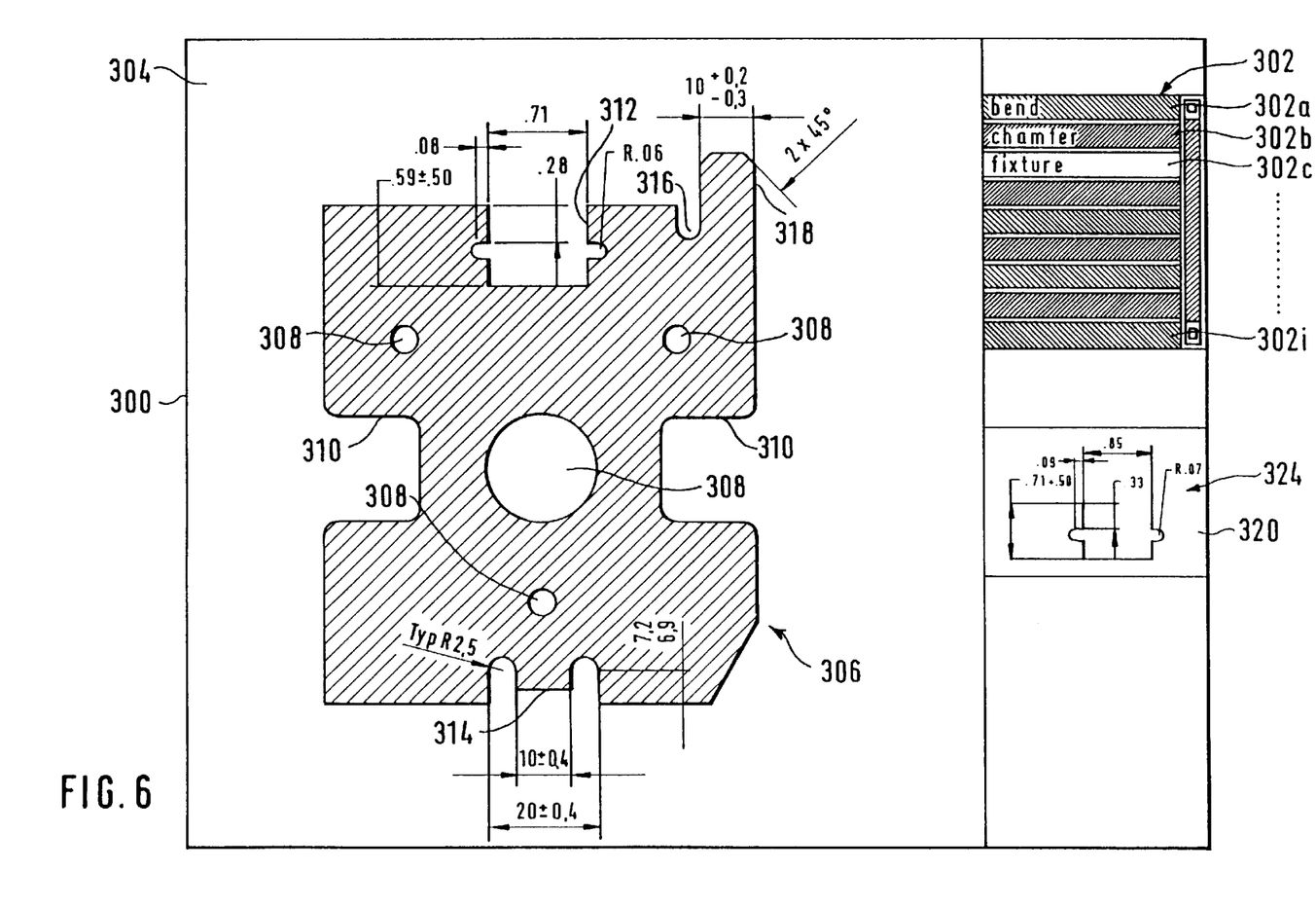
FIG. 6 shows an additional embodiment for the transfer of a dimensional representation from a reference structure to a structure in a technical drawing.

FIG. 6 shows a further example where a dimensional representation is associated with a structure.

Elements in FIG. 6 which correspond to those in FIG. 3 have been provided with identical reference numerals and a renewed description is dispensed with.

In FIG. 6, structure 312 of the technical drawing 306 is to be provided with a dimensional representation. The selection field 302c, which is called "fixture", has in this case been selected from the selection means 302 for this purpose. The respective reference structure 324 and the dimensional representation associated therewith appear in the preview window 320.

The transfer of the dimensional representation from said reference structure 324 to said structure 312 takes place in the manner which has already been described hereinbefore.

Figure 7:
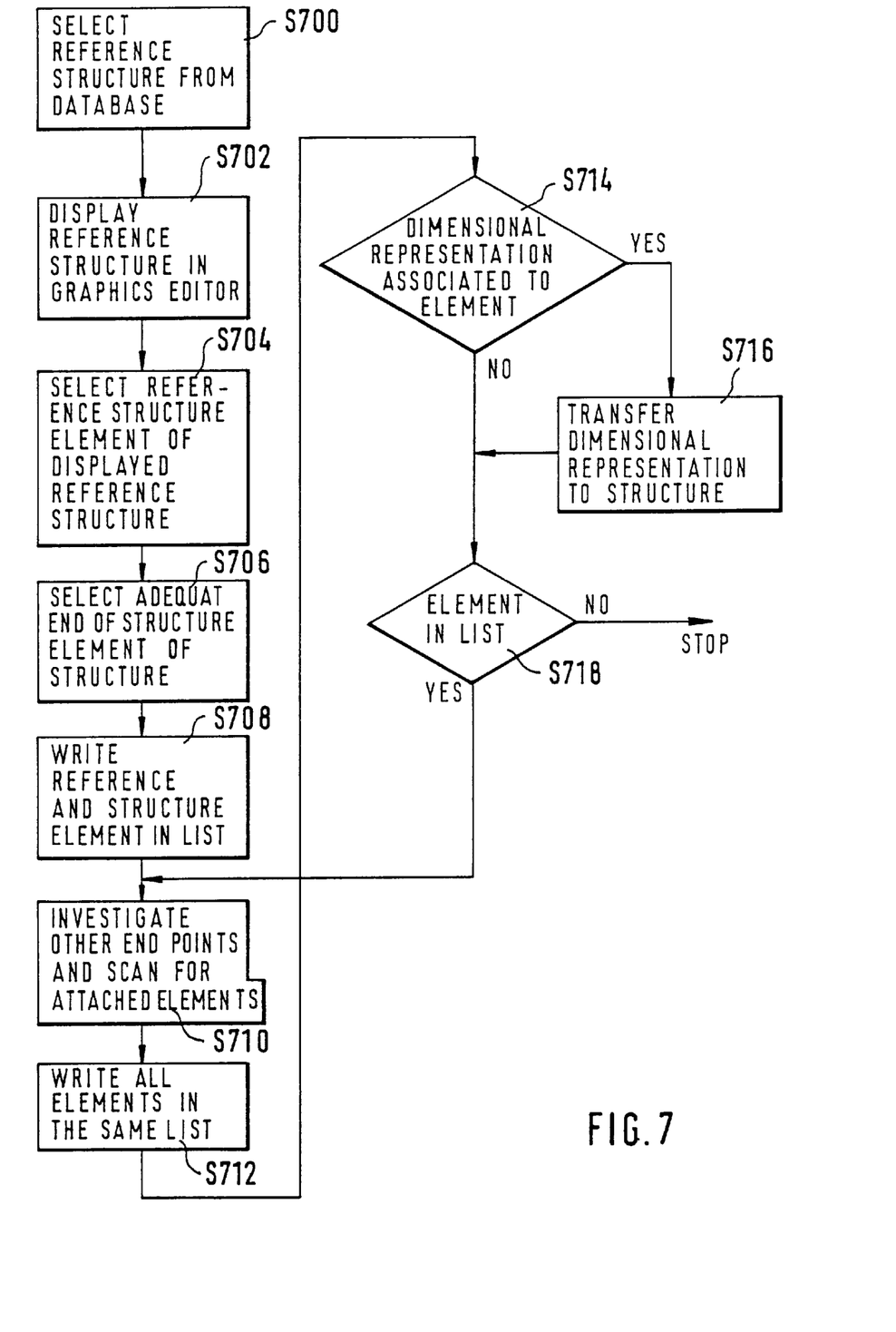
FIG. 7 shows a flowchart representing the transfer of the dimensional representation from the reference structure to the structure.

The flowchart shown in FIG. 7 shows the sequence of steps of the method according to the present invention.

In a first step S700, a reference structure is selected from the database. In step S702, this reference structure is displayed in a preview window 320, the so-called graphics editor.

In step S704, a reference structure element of the reference structure, which is displayed in said graphics editor, is selected.

In step S706, an adequate end of a structure element of a structure in the technical drawing is selected.

In step S708, the CAD system writes both the reference structure element as well as the structure element into a list.

In step S710, the CAD system investigates the other end points and scans for further elements attached thereto.

In step S712, all these elements are written into the same list which has been used in step S708.

In step S714, it is examined whether respective elements have associated therewith a dimensional representation. If this is the case, the dimensional representation is transferred to the structure in the technical drawing in step 5716, and the routine continues with step S718.

If it has been discovered in step S714 that the respective elements do not have associated therewith any dimensional representation, the routine will continue directly with step S718. In this step, it is determined whether an element which has not yet been processed exists in the list. If this is the case, the routine will return to step S710. Otherwise, the routine will be terminated.

I claim:

1. A method of associating a graphical dimensional representation element of a reference structure of a technical drawing in a CAD system with a two-dimensional representation of said structure, comprising the following steps:
   1. displaying the structure in a main window;
   2. selecting a reference structure with an associated dimensional representation element from a database;
   3. displaying the reference structure in a preview window;
   4. associating said reference structure with the structure;
   5. determining whether a topology of said structure corresponds to a topology of said reference structure; and
   6. if this is the case, transferring the dimensional representation element of said reference structure to said two-dimensional representation of said structure.

2. A method according to claim 1, wherein step 3 comprises the following steps:
   2.1. determining a reference point (Rref) on said reference structure; and
   2.2. determining a structure point (Eref) on said structure, the position of the reference point (Rref) and the position of the structure point (Eref) corresponding essentially with respect to the topologies of the reference structure and of the structure.

3. A method according to claim 2, wherein step 5 comprises the following steps:
   determining the number, nature and sequence of structure elements of the structure;
   determining the number, nature and sequence of reference structure elements of the reference structure; and
   determining that the topology of said structure corresponds to the topology of said reference structure, if the number, nature and sequence of the structure elements of said structure and of the reference structure elements of said reference structure correspond.

4. A method according to claim 3, wherein step 5 comprises the following steps:
   3.1. determining a first structure element which is part of the topology of said structure, on the basis of the structure point (Eref);
   3.2. determining whether said first structure element corresponds to a first reference structure element, said first reference structure element being part of the topology of the reference structure and being determined by the reference point (Rref); and
   3.3. for all additional elements of the structure:
       3.3.1 determining a subsequent structure element and a subsequent reference structure element; and
       3.3.2 determining whether said subsequent structure element and said subsequent reference structure element correspond.

5. A method according to claim 2, wherein step 6 comprises the following steps for all reference structure elements of the reference structure:
   4.1. determining whether a reference structure element is provided with a dimensional representation element; and,
   4.2. if this is the case, transferring this dimensional representation element to the structure element of the structure corresponding with respect to the topology.

6. A method according to claim 1, comprising the following steps carried out prior to step 1:
   producing the reference structure;
   providing said reference structure with a dimensional representation; and
   storing said reference structure and the associated dimensional representation in the database.

7. A method according to claim 1, comprising the following steps carried out subsequent to step 5:
   adapting the dimensioning data attributes of the dimensional representation transferred to the structure to the actual dimensions of said structure.

8. A CAD system used for associating a graphical dimensional representation element of a reference structure of a technical drawing in a two-dimensional representation, comprising:
   a main window in which said structure is displayed;
   a database having stored therein at least one reference structure which has associated therewith a dimensional representation element;
   means for selecting said reference structure from said database;
   a preview window in which said reference structure is displayed;
   means for associating said reference structure with the structure;
   means for determining whether the topology of said structure corresponds to the topology of said reference structure; and
   means for transferring the dimensional representation element of said reference structure to said two-dimensional representation of said structure, if the determination means determines that the topologies correspond.

* * * * *